(12) United States Patent
Noroozi et al.

(10) Patent No.: US 12,315,239 B2
(45) Date of Patent: May 27, 2025

(54) METHOD FOR CODING A SEQUENCE OF VIDEO IMAGES

(71) Applicant: Robert Bosch GmbH, Stuttgart (DE)

(72) Inventors: Mehdi Noroozi, Stuttgart (DE); Mohsen Fayyaz, Berlin (DE); Nadine Behrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 537 days.

(21) Appl. No.: 17/859,611

(22) Filed: Jul. 7, 2022

(65) Prior Publication Data

US 2023/0036743 A1 Feb. 2, 2023

(51) Int. Cl.
*G06V 10/82* (2022.01)
*G06V 10/42* (2022.01)
*G06V 10/74* (2022.01)

(52) U.S. Cl.
CPC .............. *G06V 10/82* (2022.01); *G06V 10/42* (2022.01); *G06V 10/761* (2022.01)

(58) Field of Classification Search
CPC ...... G06V 10/82; G06V 10/42; G06V 10/761; G06V 20/46; G06V 10/774; H04N 19/503

See application file for complete search history.

(56) References Cited

U.S. PATENT DOCUMENTS

2013/0107948 A1* 5/2013 DeForest ............... H04N 19/20
375/240.08

FOREIGN PATENT DOCUMENTS

DE 102018209388 A1 12/2019

OTHER PUBLICATIONS

Han ("Memory-Augmented Dense Predictive Coding for Video Representation Learning") Nature Switzerland 2020. (Year: 2020).*
Recasens, et al.: "Broaden Your Views for Self-Supervised Video Learning", arXiv:2103.16559v1, (2021), pp. 1-14.
Wang, et al.: "Enhancing Unsupervised Video Representation Learning by Decoupling the Scene and the Motion", arXiv:2009.05757v3, (2021), Assoc. for the Advancement of Artificial Intelligence, pp. 1-9.
Wang, et al.: "Long-Short Temporal Contrastive Learning of Video Transformers", arXiv:2106.09212v2, accsessed Jul. 8, 2021, pp. 1-13.

* cited by examiner

*Primary Examiner* — Molly Wilburn
(74) *Attorney, Agent, or Firm* — NORTON ROSE FULBRIGHT US LLP

(57) ABSTRACT

A method for coding a predefined time sequence of video images in a representation which is evaluable by machine made up of stationary features and nonstationary features. In the method: at least one function parameterized using trainable parameters is provided, which maps sequences of video images on representations; from the sequence of video images, N adjoining, nonoverlapping short extracts and one long extract, which contains all N short extracts are selected; using the parameterized function, a representation of the long extract and multiple representations of the short extracts are ascertained; the parameterized function is assessed; the parameters of the function are optimized with the goal that the assessment of the cost function for representations ascertained in future is expected to improve; using the function parameterized by the finished optimized parameters, the predefined time sequence of video images is mapped on the sought representation.

14 Claims, 2 Drawing Sheets

METHOD FOR CODING A SEQUENCE OF VIDEO IMAGES

CROSS REFERENCE

The present application claims the benefit under 35 U.S.C. § 119 of German Patent Application No. DE 10 2021 207 468.5 filed on Jul. 14, 2021, which is expressly incorporated herein by reference in its entirety.

FIELD

The present invention relates to the coding of a sequence of video images in a representation which facilitates the downstream machine evaluation.

BACKGROUND INFORMATION

When guiding vehicles in road traffic, observations of the vehicle surroundings are an important source of information. In particular, the dynamic behavior of other road users is often evaluated from a sequence of video images.

German Patent Application No. DE 10 2018 209 388 A1 describes a method using which a region in the surroundings of a vehicle may be ascertained from video images, in which a situation relevant for the travel and/or safety of this vehicle is present.

SUMMARY

Within the scope of the present invention, a method is provided for coding a predefined time sequence x of video images into a representation $\xi=(\psi, \phi)$ made up of stationary features $\psi$ and nonstationary features $\phi$. Such a representation is evaluable further by machine with respect to many downstream tasks. The processing of sequence x of video images to form representation $\xi=(\psi, \phi)$ is thus somewhat similar to the processing of chemical raw materials containing carbon and hydrogen to form a synthesis gas, which may in turn be used as a universal base material for manufacturing a variety of products.

In accordance with an example embodiment of the present invention, in within the scope of the method, at least one function $f_\theta(\tilde{x})$ parameterized using trainable parameters $\theta$ is provided, which maps sequences $\tilde{x}$ of video images on representations $f_\theta(\tilde{x})=\xi=(\psi, \phi)$. These parameters $\theta$ are trained in a self-monitored manner on the basis of predefined time sequence x of video images. When parameters $\theta$ are optimized to their final values $\theta^*$, function $f_{\theta^*}$ is hereby also defined, using which the predefined time sequence x of video images is mapped on searched representation $f_{\theta^*}(x)=\xi=(\psi, \phi)$.

The self-monitored training begins in that from sequence x of video images N, adjoining, nonoverlapping short extracts $x_s^{(1)}, \ldots, x_s^{(N)}$ and a long extract $x_l$, which contains all N short extracts $x_s^{(1)}, \ldots, x_s^{(N)}$, are selected. Using parameterized function $f_\theta$, whose behavior is characterized by the present state of parameters $\theta$, a representation $f_\theta(x_l)=\xi_l=(\psi_l, \phi_l)$ of long extract $x_l$ and multiple representations $f_\theta(x_s^{(i)})=\xi_s^{(i)}=(\psi_s^{(i)}, \phi_s^{(i)})$, of short extracts $x_s^{(i)}$ for i=1, ..., N are ascertained. Parameters $\theta$ may, for example, be randomly initialized at the beginning of the training and then change in the course of the optimization.

Parameterized function $f_\theta$ is assessed using a predefined cost function $\mathcal{L}$ about the extent to which representation $\xi_l=(\psi_l, \phi_l)$ of long extract $x_l$ is consistent with representations $\xi_s^{(i)}=(\psi_s^{(i)}, \phi_s^{(i)})$ of short extracts $x_s^{(i)}$ with regard to at least one predefined consistency condition. The self-monitored optimization of parameters $\theta$ is directed to the goal of the assessment of the cost function being expected to improve for representations $f_\theta(x_l)=\xi_l=(\psi_l, \phi_l)$ and $f_\theta(x_s^{(i)})=\xi_s^{(i)}=(\psi_s^{(i)}, \phi_s^{(i)})$ ascertained in future.

The self-monitored character of this optimization is that only the at least one consistency condition between representation $\xi_l$ of long extract $x_l$, on the one hand, and representations $\xi_s^{(i)}$ of short extracts $x_s^{(i)}$, on the other hand, is utilized, which in turn are both ascertained from identical predefined sequence x of video images. No "ground truth" applied from an external source is required, which "labels" training sequences of video images using setpoint representations, on which function $f_\theta(\tilde{x})$ should ideally map these training sequences. On the one hand, such labeling generally requires additional manual work and is therefore costly. On the other hand, the question arises in such monitored training to what extent the training completed on one sequence of video images is also transferable to sequences of video images.

Several examples of consistency conditions and contributions to cost function $\mathcal{L}$, in which these consistency conditions may manifest themselves, are indicated. These consistency conditions each contain similarity comparisons between features of long extract $x_l$, on the one hand, and features of short extracts $x_s^{(i)}$ for i=1, ..., N, on the other hand.

For these similarity comparisons, a similarity measure is required which maps two features $z_1$ and $z_2$ on a numeric value for the similarity. One example of such a similarity measure is the cosine similarity $$sim_h(z_1, z_2) = \frac{1}{\tau} \frac{h(z_1)^T h(z_2)}{\|h(z_1)\|\|h(z_2)\|}.$$

Herein, h is a predefined transformation, and $\tau$ is a temperature parameter for the scaling. Transformation h may in particular be a trained transformation, for example.

The similarity measured by cost function $\mathcal{L}$ may in this case in particular be related in each case to similarities which supply a comparison of particular features $\psi_s^{(i)}$ or $g(\phi_s^{(1)}, \ldots, \phi_s^{(N)})$ of short extracts $x_s^{(i)}$ for i=1, ..., N, on the one hand, to features $\overline{\psi}_l$ or $\overline{\phi}_l$ of a randomly generated sequence $\overline{x}_l$ of video images. The latter similarity is ideally to be zero, but is not in practice. The measurement of the relationship by the cost function is a step toward measuring a signal-to-noise ratio, instead of only a signal strength, in communication engineering.

From a randomly generated sequence $\overline{x}_l$ of video images, parameterized function $f_\theta$ generates a representation $\xi_{neg}=(\psi_{neg}, \phi_{neg})$. Representations $\xi_{neg}$ obtained for a predefined set of randomly generated sequences $\overline{x}_l$ may be combined into a set $\mathcal{N}$, $\mathcal{N}_\psi$ being the set of all stationary features $\psi_{neg}$ and $\mathcal{N}_\phi$ being the set of all nonstationary features $\phi_{neg}$ of representations $\xi_{neg}$.

In one particularly advantageous embodiment of the present invention, the at least one consistency condition includes that stationary features $\psi_l$ of long extract $x_l$ are similar to stationary features $\psi_s^{(i)}$ of short extracts $x_s^{(i)}$ for i=1, ..., N. If these are actually stationary features, they have to remain stationary both on the time scale of short extracts $x_s^{(i)}$ and also on the time scale of long extract $x_l$. This consistency condition may contribute, for example, a contribution $$\mathcal{L}_s = -\log \frac{\exp(sim_{h_s}(\psi_s^{(j)}, \psi_l))}{\sum_{\overline{\psi}_l \in N_\psi \cup \{\psi_l\}} \exp(sim_{h_s}(\psi_s^{(j)}, \overline{\psi}_l))}$$

to cost function $\mathcal{L}$. In this case, in similarity measure $sim_{h_s}$, $h_s$ is a trained transformation h, which is specifically used for the examination of the stationary features. $\psi_s^{(j)}$ is a stationary feature of an arbitrary randomly selected short extract $x_s^{(j)}$.

In a further particularly advantageous embodiment of the present invention, the at least one consistency condition includes that the nonstationary features $\phi_l$ of long extract $x_l$ are similar to an aggregation $g(\phi_s^{(1)}, \ldots, \phi_s^{(N)})$, formed using an aggregation function g of nonstationary features $\phi_s^{(1)}, \ldots, \phi_s^{(N)}$ of short extracts $x_s^{(1)}, \ldots, x_s^{(N)}$. The result of the changes in the video image caused by the nonstationary features is not dependent on whether the sequence of video images is played back in one stroke or is paused after each short extract $x_s^{(i)}$. This consistency condition may contribute, for example, a contribution $$\mathcal{L}_n = -\log \frac{\exp(sim_{h_n}(\phi_g, \phi_l))}{\sum_{\overline{\phi}_l \in N_\phi \cup \{\phi_l\}} \exp(sim_{h_n}(\phi_g, \overline{\phi}_l))}$$

to cost function $\mathcal{L}$ Therein, $\phi_g = g(\phi_s^{(1)}, \ldots, \phi_s^{(N)})$ is an aggregated version of nonstationary features. In similarity measure $sim_{h_n}$, $h_n$ is a trained transformation h, which is specifically used for the examination of nonstationary features.

Aggregation function g may include in particular, for example
- a summation, and/or
- a linear mapping, and/or
- a mapping by a multilayer perceptron, MLP, and/or
- a mapping by a recurrent neural network, RNN.

In a further particularly advantageous embodiment of the present invention, cost function $\mathcal{L}$ additionally measures the similarity between representation $\xi_l$ of long extract $x_l$, on the one hand, and representation $\hat{\xi}_l$ corresponding thereto for a modification $\hat{x}_l$ of long extract $x_l$ including the same semantic content. This may be quantified, for example, in a contribution $$\mathcal{L}_i = -\log \frac{\exp(sim_{h_i}(\xi_l, \hat{\xi}_l))}{\sum_{\overline{\xi}_l \in N \cup \{\xi_l\}} \exp(sim_{h_i}(\xi_l, \overline{\xi}_l))}$$

to cost function $\mathcal{L}$. This contribution fulfills the function of the typical contrastive training with respect to images or videos. Modification $\hat{x}_l$ of long extract $x_l$ including the same semantic content corresponds to positive examples of that which is to be assessed as similar to representation $\xi_l$ of long extract $x_l$. In contrast, representations $\overline{\xi}_l$ obtained for randomly generated sequences $\overline{x}_l$ correspond to negative examples of that which is not to be assessed as similar to representation $\xi_l$ of long extract $x_l$. In similarity measure $sim_{h_i}$, $h_i$ is a trained transformation h, which is specifically used for the comparison to modification $\hat{x}_l$ of long extract $x_l$ including the same semantic content.

Modification $\hat{x}_l$ including the same semantic content may be generated in particular, for example, by selection of a random image detail and enlargement back to the original size, and/or
reflection, and/or
color change
from long extract $x_l$.

As explained above, self-monitored trained representation $f_{\theta*}(x) = \xi = (\psi, \phi)$ is the starting material for many further evaluations of time sequence x of video images. In one particularly advantageous embodiment, the recognition of at least one action which time sequence x of video images shows is assessed from representation $f_{\theta*}(x) = \xi = (\psi, \phi)$. Alternatively or also in combination therewith, for example, different actions which time sequence x of video images shows may be delimited from one another. In this way, for example, large amounts of video material may be broken down in an automated manner into sections which show specific actions. If, for example, a film is to be compiled which shows specific actions, it is possible in this way to search in an automated manner for suitable starting material. This may save working time to a significant extent in relation to a manual search.

In a further advantageous embodiment of the present invention, a sequence x* of video images similar to predefined time sequence x of video images is ascertained from a database on the basis of representation $f_{\theta*}(x) = \xi = (\psi, \phi)$. This search operates detached from simple features of the images which are included in sequence x, on the level of actions visible in sequence x. This search may also save a large amount of working time for the manual search, for example, when compiling a video. Furthermore, sequences x* similar to a predefined sequence x of video images may be used, for example, to enlarge a training data set for a classifier or another machine learning application.

In a further advantageous embodiment of the present invention, an activation signal is ascertained from representation $f_{\theta*}(x) = \xi = (\psi, \phi)$, and/or from a processing product evaluated therefrom. A vehicle, a system for the quality control of products, and/or a system for the monitoring of regions can be activated using this activation signal. As explained above, the processing of original sequence x of video images to form representation $f_{\theta*}(x) = \xi = (\psi, \phi)$ facilitates the downstream processing. The probability is therefore increased that the reaction triggered by the activation signal at the particular activated technical system is appropriate to the situation represented by sequence x of video images.

The method may in particular be entirely or partially computer implemented. The present invention therefore also relates to a computer program including machine-readable instructions which, when they are executed on one or multiple computer(s), prompt the computer or computers to carry out the described method. In this meaning, controllers for vehicles and embedded systems for technical devices which are also capable of executing machine-readable instructions are also to be considered computers.

The present invention also relates to a machine-readable data medium and/or a download product including the computer program. A download product is a digital product transferable via a data network, i.e., downloadable by a user of the data network, which may be offered for sale, for example, in an online shop for immediate download.

Furthermore, a computer may be equipped with the computer program, the machine-readable data medium, or the download product.

Further measures improving the present invention are described in greater detail hereinafter together with the description of the preferred exemplary embodiments of the present invention on the basis of figures.

DETAILED DESCRIPTION OF EXAMPLE EMBODIMENTS

Figure 1:
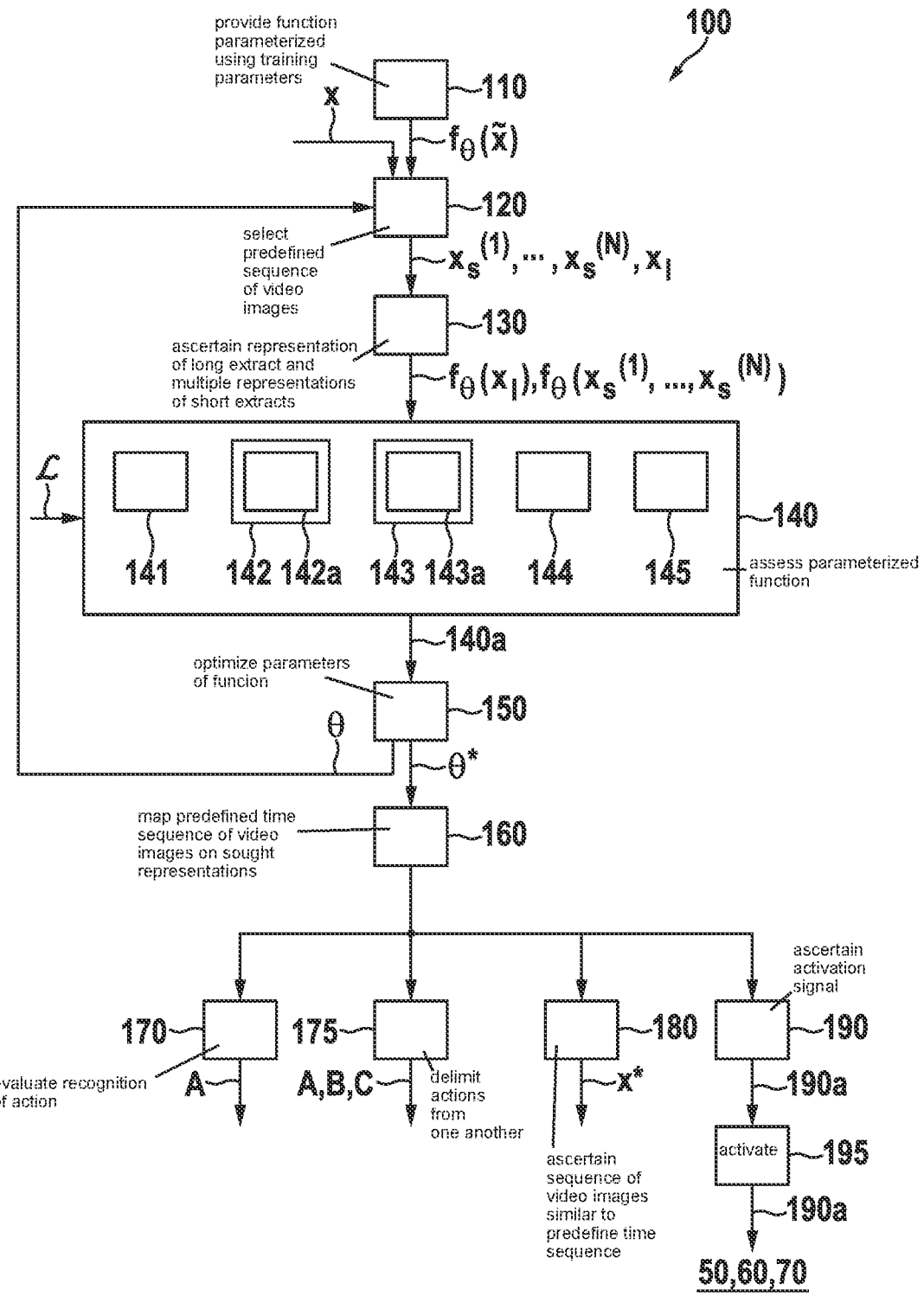
FIG. 1 shows an exemplary embodiment of method 100 of the present invention for coding a sequence x of video images in a representation $\xi = (\psi, \phi)$ which is evaluable by machine.

FIG. 1 is a schematic flowchart of an exemplary embodiment of method 100 for coding a sequence x of video images in a representation $\xi = (\psi, \phi)$ which is evaluable by machine.

In step 110 at least one function $f_\theta(\tilde{x})$ parameterized using trainable parameters $\theta$ is provided, which maps sequences x of video images on representations $f_\theta(\tilde{x}) = (\psi, \phi)$.

In step 120, from predefined sequence x of video images, N adjoining, nonoverlapping short extracts $x_s^{(1)}, \ldots, x_s^{(N)}$ and one long extract $x_l$, which contains all N short extracts $x_s^{(1)}, \ldots, x_s^{(N)}$, are selected. In this case, in particular, for example, long extract $x_l$ may correspond to complete sequence x of video images.

In step 130, using parameterized function $f_\theta$, a representation $f_\theta(x_l) = \xi_l = (\psi_l, \psi_l)$ of long extract $x_l$ and multiple representations $f_\theta(x_s^{(i)}) = \xi_s^{(i)} = (\psi_s^{(i)}, \phi_s^{(i)})$, of short extracts $x_s^{(i)}$ for $i = 1, \ldots, N$ are ascertained. If there are multiple such parameterized functions $f_\theta$, long extract $x_l$ and different short extracts $x_s^{(i)}$ may also be processed using different functions $f_\theta$.

In step 140, parameterized function $f_\theta$ is assessed using a predefined cost function $\mathcal{L}$ about the extent to which representation $\xi_l = (\psi_l, \phi_l)$ of long extract $x_l$ is consistent with regard to at least one predefined consistency condition with representations $\xi_s^{(i)} = (\psi_s^{(i)}, \phi_s^{(i)})$, of short extracts $x_s^{(i)}$.

In this case, in particular, for example, according to block 141, the at least one consistency condition may include that stationary features $\Psi_l$ of long extract $x_l$ are similar to stationary features $\psi_s^{(i)}$ of short extracts $x_s^{(i)}$ for $i = 1, \ldots, N$.

According to block 142, the at least one consistency condition may include, for example, that nonstationary features $\phi_l$ of long extract $x_l$ are similar to an aggregation $g(\phi_s^{(1)}, \ldots, \phi_s^{(N)})$, formed using an aggregation function g, of nonstationary features $\phi_s^{(1)}, \ldots, \phi_s^{(N)}$ of short extracts $x_s^{(1)}, \ldots, x_s^{(N)}$. As aggregation function g, in this case according to block 142a in particular, for example a summation, and/or a linear mapping, and/or a mapping by a multilayer perceptron, MLP, and/or a mapping by a recurrent neural network, RNN, may be used.

According to block 143, cost function $\mathcal{L}$ may, for example, additionally measure the similarity between representation $\xi_l$ of long extract $x_l$, on the one hand, and representation $\hat{\xi}_l$ corresponding thereto for a modification $\hat{x}_l$ of long extract $x_l$ including the same semantic content. According to block 143a, modification $\hat{x}_l$ including the same semantic content may be generated in particular, for example, by selection of a random image detail and enlargement back to the original size, and/or reflection, and/or color change from long extract $x_l$.

According to block 144, a similarity measured by cost function $\mathcal{L}$ can be related in each case to similarities which supply a comparison of particular features $\psi_s^{(i)}$ or $g(\phi_s^{(1)}, \ldots, \phi_s^{(N)})$ of short extracts $x_s^{(i)}$ for $i = 1, \ldots, N$, on the one hand, to features $\overline{\psi}_l$ or $\overline{\phi}_l$ of a randomly generated sequence $\overline{x}_l$ of video images.

According to block 145, at least one similarity between features $z_1$ and $z_2$ may be measured using a cosine similarity.

In step 150, parameters $\theta$ of function $f_\theta$ are optimized with the goal that the assessment of the cost function for representations $f_\theta(x_l) = \xi_l = (\psi_l, \phi_l)$ and $f_\theta(x_s^{(i)}) = \xi_s^{(i)} = (\psi_s^{(i)}, \phi_s^{(i)})$ ascertained in future is expected to improve.

In step 160, using function $f_{\theta*}$ parameterized by finished optimized parameters $\theta*$, predefined time sequence x of video images is mapped on sought representation $f_{\theta*}(x) = \xi = (\psi, \phi)$. As explained above, this representation $f_{\theta*}(x) = \xi = (\psi, \phi)$ may be used similarly to a synthesis gas in chemistry for further processing into a variety of further results relevant for the particular application.

In step 170, the recognition of at least one action A, which time sequence x of video images shows, is evaluated from representation $f_{\theta*}(x) = \xi = (\psi, \phi)$.

In step 175, on the basis of changes of representation $f_{\theta*}(x) = \xi = (\psi, \phi)$, different actions A, B, C, which time sequence x of video images shows, are delimited from one another.

In step 180, on the basis of representation $f_{\theta*}(x) = \xi = (\psi, \phi)$, a sequence x* of video images similar to predefined time sequence x is ascertained from a database.

In step 190, an activation signal 190a is ascertained from representation $f_{\theta*}(x) = \xi = (\psi, \phi)$, and/or from a processing product evaluated therefrom.

In step 195, a vehicle 50, a system 60 for the quality control of products, and/or a system 70 for monitoring areas is activated using this activation signal 190a.

Figure 2:
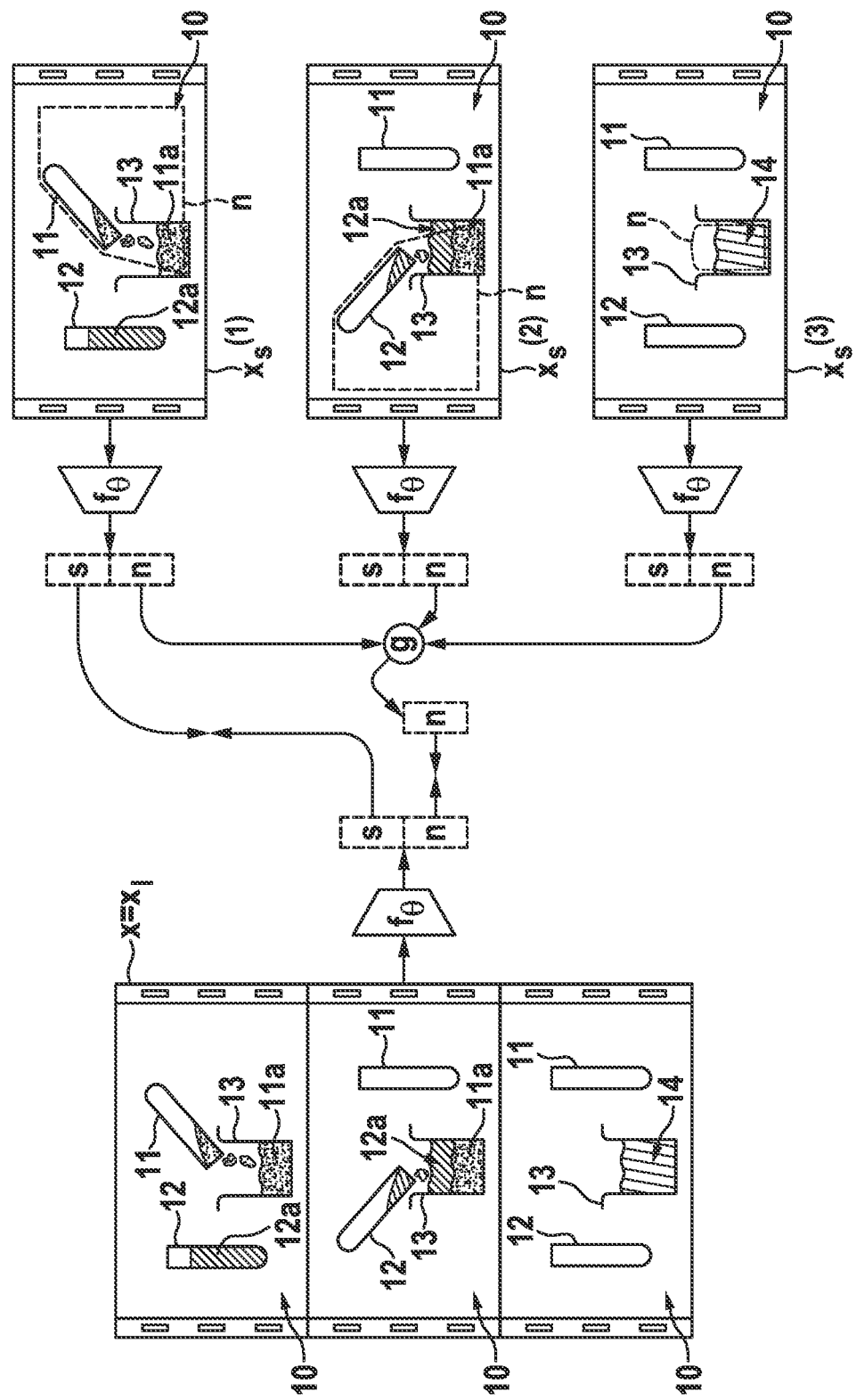
FIG. 2 shows an illustration of the self-monitored training on the basis of the example of a scene 10 in a chemical laboratory, according to the present invention.

FIG. 2 illustrates the above-described self-monitored training on the basis of the example of a scene 10 in a chemical laboratory.

On the left in FIG. 2, complete time sequence x of video images is plotted, which also corresponds here to long extract $x_l$. On the right in FIG. 2, three short extracts $x_s^{(1)}$, $x_s^{(2)}$, $x_s^{(3)}$ are plotted, into which time sequence x was broken down.

Scene 10 includes pouring two substances 11a, 12a from test tubes 11, 12 into a beaker 13 and the subsequent reaction of substances 11a, 12a to form a product 14. At the beginning of scene 10, test tube 11 is picked up and its content 11a is poured into beaker 13. Empty test tube 11 is then put down again. Next, test tube 12 is picked up and its content 12a is also poured into beaker 13, where it first accumulates above substance 11a already located there as a separate layer. Empty test tube 12 is put down again, and the two substances 11a and 12a mix thoroughly in beaker 13 to react to form product 14.

Stationary component s of this scene 10 is, that there is a laboratory scene including two test tubes 11 and 12 and a beaker 13 at all. Nonstationary component n is that test tubes 11 and 12 are picked up, their particular content 11a or 12a is poured into beaker 13, and the reaction to form product 14 takes place in beaker 13.

Short extract $x_s^{(1)}$ includes the time period in which first test tube 11 is picked up, substance 11a is poured into beaker 13, and first test tube 11 is put down again. These actions accordingly represent nonstationary component n of short extract $x_s^{(1)}$.

Short extract $x_s^{(2)}$ includes the time period in which second test tube 12 is picked up, substance 12a is poured into beaker 13, and second test tube 12 is put down again. These actions accordingly represent nonstationary component n of short extract $x_s^{(2)}$.

Short extract $x_s^{(3)}$ includes the time period in which both test tubes 11 and 12 stand at their location and the reaction of the two substances 11a and 12a to form product 14 takes place inside beaker 13. This reaction accordingly represents nonstationary component n of short extract $x_s^{(3)}$.

The above-described contrastive training rewards it if the aggregation of nonstationary components n of all short extracts $x_s^{(1)}$, $x_s^{(2)}$, $x_s^{(3)}$ using aggregation function g is similar to nonstationary component n of long extract $x_l$. Ultimately, nothing changes due to the division of long extract $x_l$ into short extracts $x_s^{(1)}$, $x_s^{(2)}$, $x_s^{(3)}$ with regard to what is done overall in the course of scene 10.

The contrastive training also rewards it if stationary component s, namely the fundamental presence of two test tubes 11, 12, one beaker 13, and a certain amount of chemicals 11a, 12a, or 14, in all short extracts $x_s^{(1)}$, $x_s^{(2)}$, $x_s^{(3)}$ corresponds to the stationary component of long extract $x_l$.

What is claimed is:

1. A method for coding a predefined time sequence of video images in a sought representation which is evaluable by a machine, the sought representation being made up of stationary features and nonstationary features, the method comprising the following steps:
   providing at least one function parameterized using trainable parameters, the parameterized function configured to map sequences of video images on representations made up of stationary features and non-stationary features;
   selecting, from the predefined time sequence of video images, N adjoining, nonoverlapping short extracts and one long extract which contains all N short extracts;
   ascertaining, using the parameterized function, a representation of the long extract $x_l$ and multiple representations of the short extracts;
   assessing the parameterized function using a redefined cost function about an extent to which the representation of the long extract is consistent with the representations of the short extracts with regard to at least one predefined consistency condition;
   optimizing the parameters of the parameterized function with a goal that the assessment of the cost function for the representation of the long extract and the representations of the short extracts representations ascertained in future is expected to improve;
   mapping, using the function parameterized by the optimized parameters, the predefined time sequence of video images on the sought representation.

2. The method as recited in claim 1, wherein the at least one consistency condition includes that the stationary features of the long extract are similar to the stationary features of the short extracts.

3. The method as recited in claim 1, wherein the at least one consistency condition includes that the nonstationary features of the long extract are similar to an aggregation formed using an aggregation function of the nonstationary features of the short extracts.

4. The method as recited in claim 3, wherein the aggregation function includes:
   a summation, and/or
   a linear mapping, and/or
   a mapping by a multilayer perceptron (MLP), and/or
   a mapping by a recurrent neural network (RNN).

5. The method as recited in claim 1, wherein the cost function additionally measures a similarity between the representation of the long extract, on the one hand, and of the representation corresponding thereto for a modification of the long extract including the same semantic content.

6. The method as recited in claim 5, wherein the modification including the same semantic content is generated by
   selection of a random image detail and enlargement back to an original size, from the long extract, and/or
   reflection, from the long extract, and/or
   color change, from the long extract.

7. The method as recited in claim 2, wherein the similarity measured by the cost function is related in each case to similarities, which supply a comparison of the stationary and non-stationary features of the short extracts, on the one hand, to stationary and non-stationary features of a randomly generated sequence of video images.

8. The method as recited in claim 2, wherein at least one similarity between features $z_1$ and $z_2$ is ascertained using a cosine similarity of the form $$sim_h(z_1, z_2) = \frac{1}{\tau} \frac{h(z_1)^T h(z_2)}{\|h(z_1)\|\|h(z_2)\|}$$

in which h is a predefined transformation and $\tau$ is a temperature parameter.

9. The method as recited in claim 1, wherein from the sought representation, a recognition of at least one action, which is shown in the predefined time sequence of video images, is evaluated.

10. The method as recited in claim 1, wherein, based on the sought representation, a sequence of video images similar to the predefined time sequence of video images is ascertained from a database.

11. The method as recited in claim 1, wherein, based on changes in the sought representation, different actions, which are shown in the time sequence of video images, are delimited from one another.

12. The method as recited in claim 1, wherein:
   an activation signal is ascertained from the sought representation and/or from a processing product evaluated from the sought representation, and
   a vehicle and/or a system for quality control of products and/or a system for monitoring areas, is activated using the activation signal.

13. A non-transitory machine-readable data medium on which is stored a computer program for coding a predefined time sequence of video images in a sought representation which is evaluable by a machine, the sought representation being made up of stationary features and nonstationary features, the computer program, when executed by one or more computers, causing the one or more computers to perform the following steps:
   providing at least one function parameterized using trainable parameters, the parameterized function configured to map sequences of video images on representations made up of stationary features and non-stationary features;
   selecting, from the predefined time sequence of video images, N adjoining, nonoverlapping short extracts and one long extract which contains all N short extracts;

ascertaining, using the parameterized function, a representation of the long extract $x_l$ and multiple representations of the short extracts;

assessing the parameterized function using a redefined cost function about an extent to which the representation of the long extract is consistent with the representations of the short extracts with regard to at least one predefined consistency condition;

optimizing the parameters of the parameterized function with a goal that the assessment of the cost function for the representation of the long extract and the representations of the short extracts representations ascertained in future is expected to improve; and mapping, using the function parameterized by the optimized parameters, the predefined time sequence of video images on the sought representation.

14. One or multiple computers configured to code a predefined time sequence of video images in a sought representation which is evaluable by a machine, the sought representation being made up of stationary features and nonstationary features, the one or computers configured to:

provide at least one function parameterized using trainable parameters, the parameterized function configured to map sequences of video images on representations made up of stationary features and non-stationary features;

select, from the predefined time sequence of video images, N adjoining, nonoverlapping short extracts and one long extract which contains all N short extracts;

ascertain, using the parameterized function, a representation of the long extract $x_l$ and multiple representations of the short extracts;

assess the parameterized function using a redefined cost function about an extent to which the representation of the long extract is consistent with the representations of the short extracts with regard to at least one predefined consistency condition;

optimize the parameters of the parameterized function with a goal that the assessment of the cost function for the representation of the long extract and the representations of the short extracts representations ascertained in future is expected to improve; and map, using the function parameterized by the optimized parameters, the predefined time sequence of video images on the sought representation.

\* \* \* \* \*